United States Patent [19]

Boggs et al.

[11] 3,889,550

[45] June 17, 1975

[54] IMPACT ABSORBING NOISE SUPPRESSION DEVICE

[75] Inventors: Roger L. Boggs, East Peoria; Harold L. Reinsma, Dunlap, both of Ill.

[73] Assignee: Caterpillar Tractor Co., Peoria, Ill.

[22] Filed: Nov. 19, 1973

[21] Appl. No.: 416,828

[52] U.S. Cl. ............... 74/443; 74/243 R; 74/461
[51] Int. Cl. .................... F16h 55/14; F16h 55/30
[58] Field of Search ..... 74/243 R, 243 NC, 243 FC, 74/243 PC, 243 S, 443, 461; 305/13, 38, 57, 10, 54

[56] References Cited
UNITED STATES PATENTS

| 1,638,140 | 8/1927 | Best | 74/243 R |
| 1,870,801 | 8/1932 | Engstrom | 74/243 PC |
| 2,374,644 | 5/1945 | Bombardier | 74/243 PC |
| 3,499,340 | 3/1970 | Teranishi et al. | 74/243 PC |
| 3,504,562 | 4/1970 | Hirych | 74/243 R |

FOREIGN PATENTS OR APPLICATIONS

| 1,040,335 | 10/1958 | Germany | 74/243 PC |
| 166,326 | 5/1906 | Germany | 74/243 R |

*Primary Examiner*—Samuel Scott
*Assistant Examiner*—Allan R. Burke
*Attorney, Agent, or Firm*—Phillips, Moore, Weissenberger, Lempio & Strabala

[57] ABSTRACT

A notched drive sprocket for track-type vehicles having improved noise suppression characteristics is provided. The drive sprocket includes means for absorbing impact energy of the track bushings as they engage the drive sprocket comprising elastomeric inserts disposed within the root area of the sprocket teeth. The impact absorption means further automatically eject dirt or other materials from the root area which have been compacted therein by the bushings.

6 Claims, 6 Drawing Figures

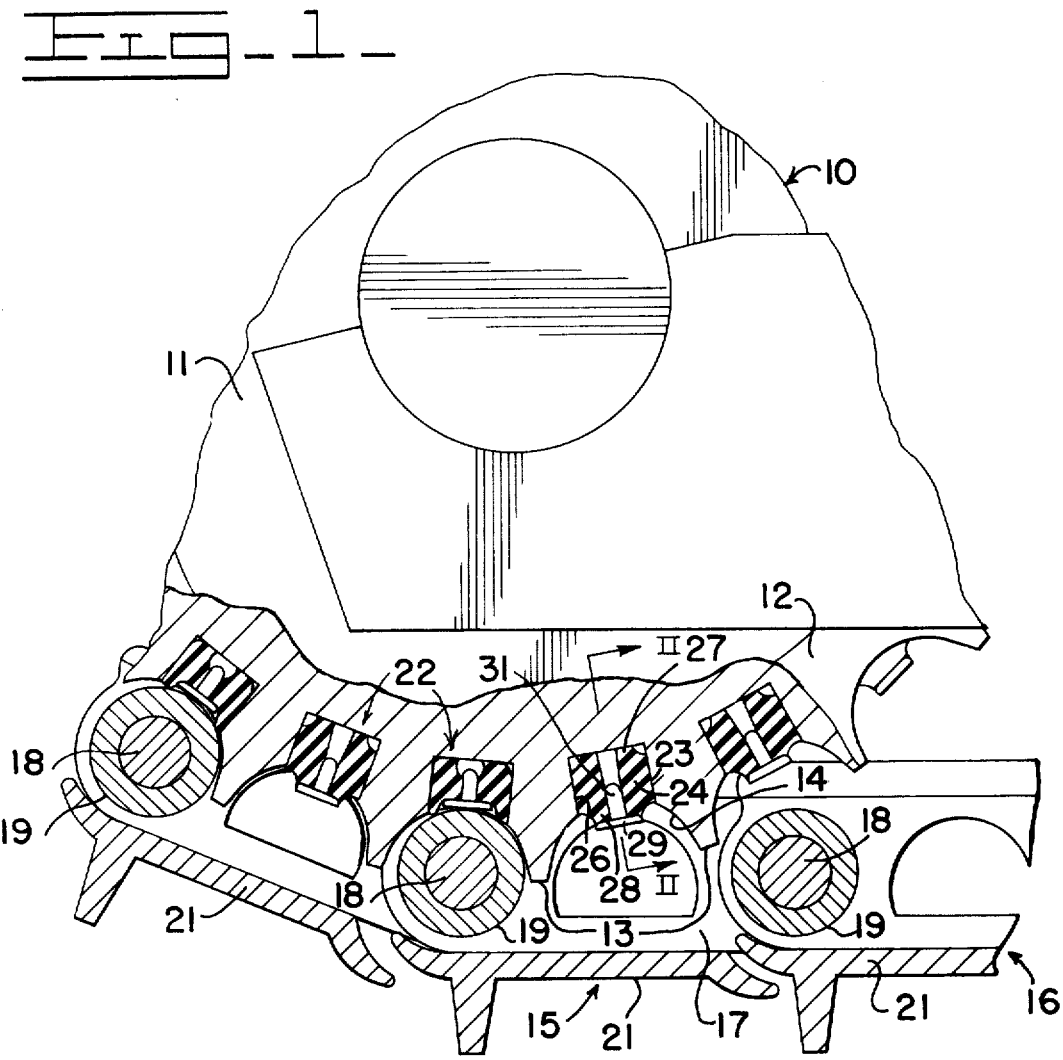
Fig-1-
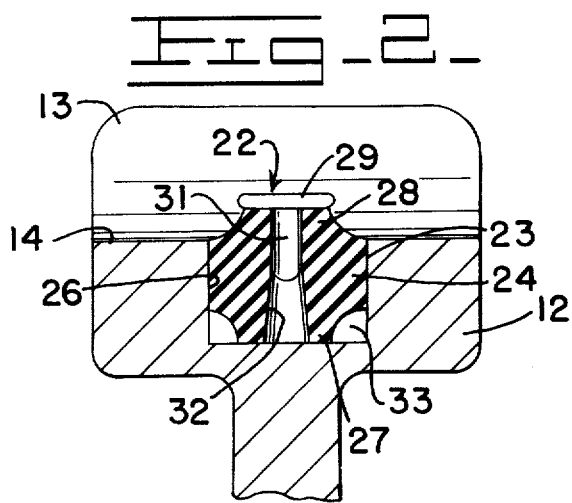
Fig-2-

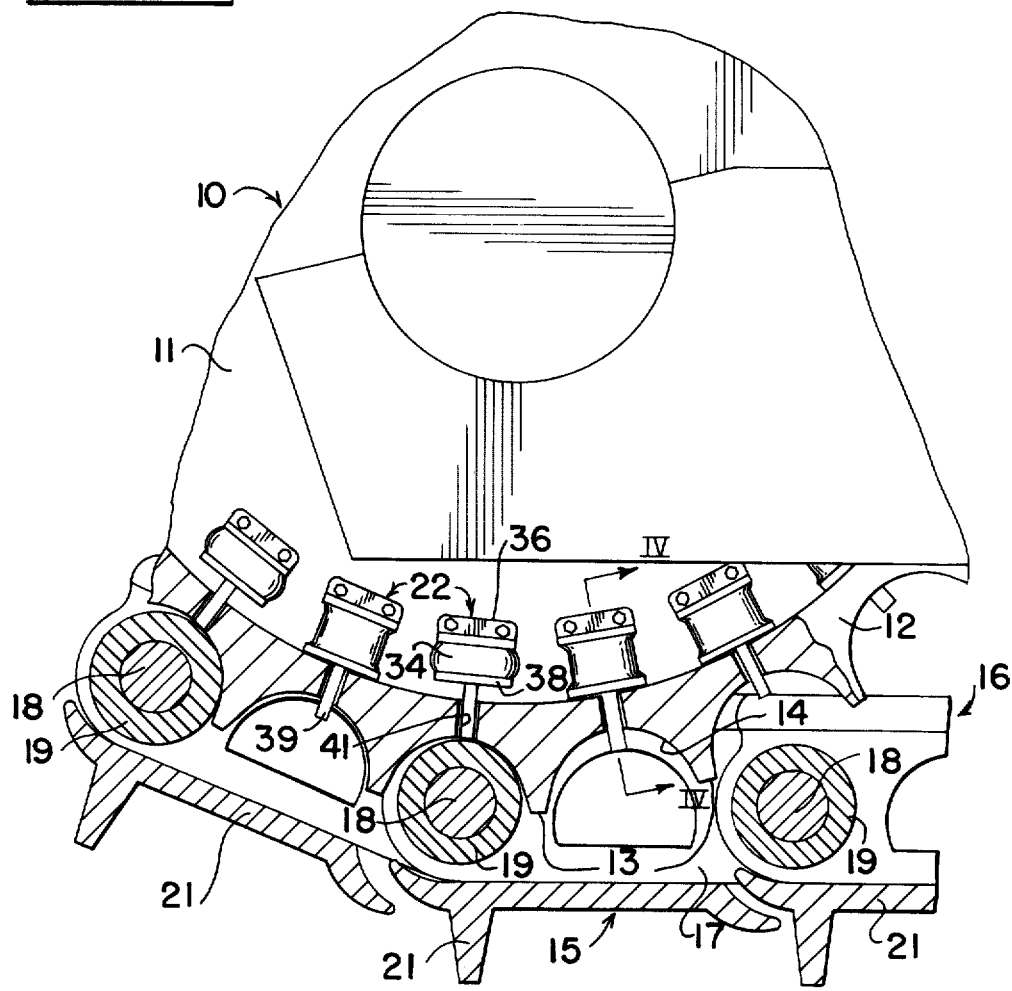
Fig-3-
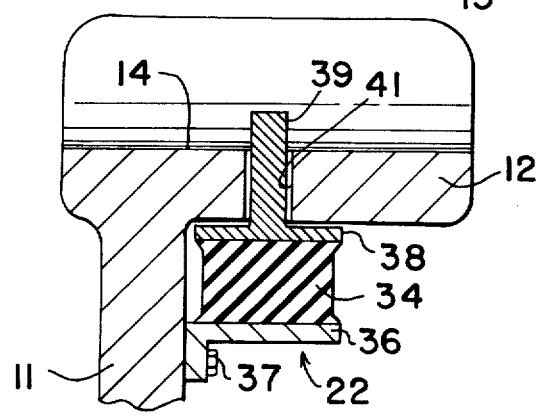
Fig-4-

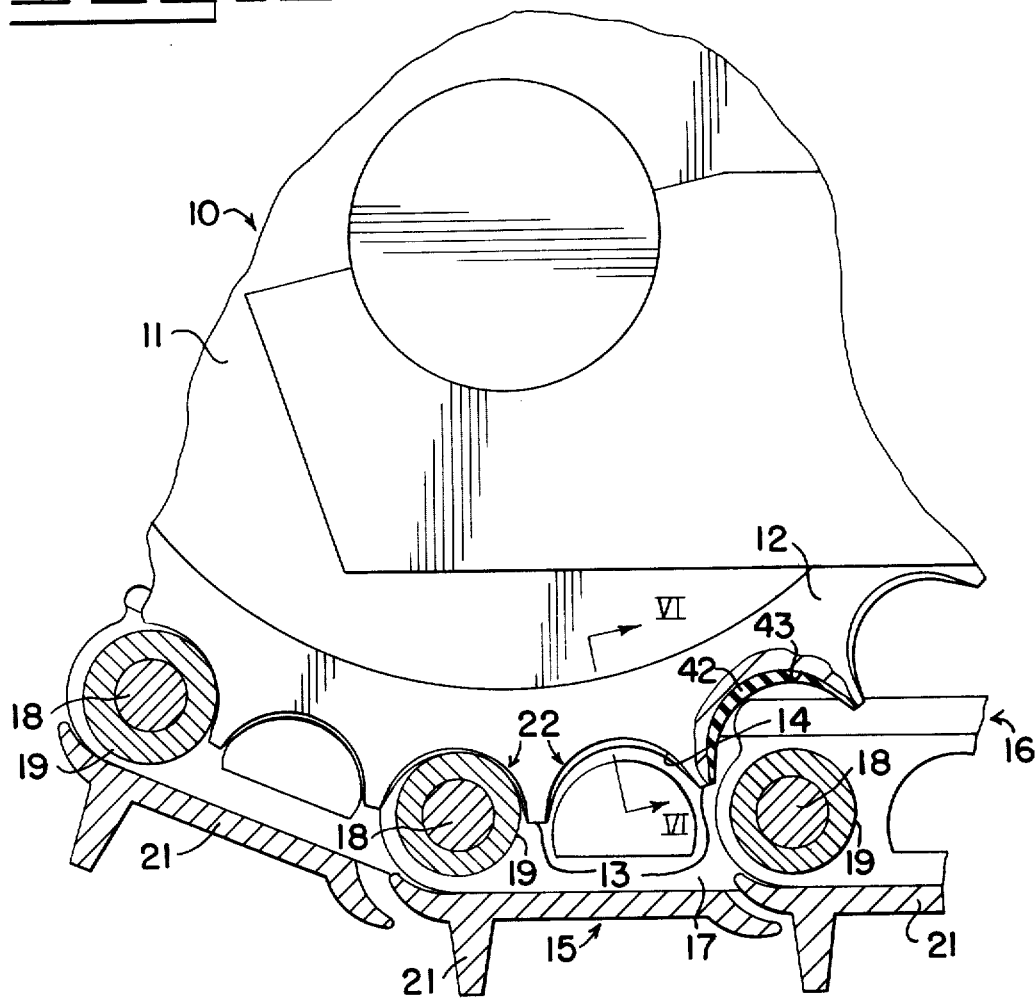
Fig_5_
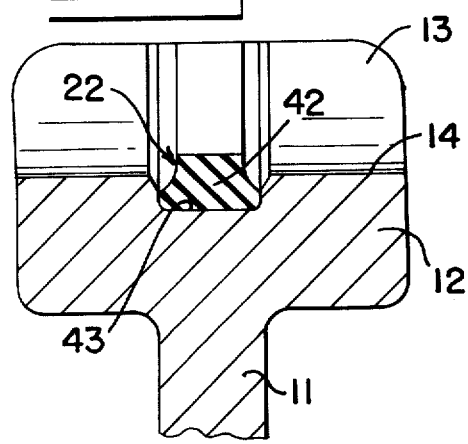
Fig_6_

IMPACT ABSORBING NOISE SUPPRESSION DEVICE

BACKGROUND OF THE INVENTION

This invention relates to an improved notched drive sprocket for endless track assemblies of the type used for track-type vehicles such as crawler tractors. In particular, the invention relates to an improved notched drive sprocket which minimizes metal-to-metal contact between the drive sprocket and track assembly components, e.g. bushings, which engage the sprocket during operation of the vehicle.

Conventional endless track assemblies for use with track-type vehicles comprise a series of track links interconnected by pins fitted with an external bushing. The pin and bushing connections of these conventional assemblies provide a drive means for co-action with a track-driving sprocket whereby the track is forcibly driven by rotational movement of the drive sprocket.

Although such a track construction has gained wide acceptance, it is subject to several problems. In particular, one problem is that of noise generated by the bushings impacting upon the drive sprocket. Others are the high rate of wear and power losses due to these impactions. Additionally, dirt or other materials tend to become impacted within the notches of the sprocket during vehicle movement, thus interfering with the interaction of the drive means and sprocket.

The stringent limitations on permissible noise levels for track-type vehicles imposed by Federal legislation render it imperative to reduce customary noise levels associated with operation of these vehicles. Although attempts have been made to accomplish this, as by cushioning the track assembly components, the drive sprocket, or both, as exemplified by the subject matter of U.S. Pat. Nos. 3,504,562 and 2,338,817, and U.S. application Ser. No. 420,720, filed Nov. 30, 1973, by Haslett et al, of common assignment herewith, some of these methods have frequently been elaborate, expensive or unsatisfactory.

SUMMARY AND OBJECTS OF THE INVENTION

Accordingly, the invention provides a notched drive sprocket having impact absorbing means comprising a plurality of elastomeric inserts disposed within corresponding cavities formed in the root area of the drive sprocket teeth. The elastomeric inserts absorb the impact energy of the track bushings prior to the metal-to-metal contact of the bushings with the roots of the sprocket teeth so that the noise customarily generated by the engagement of the bushings with the sprocket is substantially reduced. In an alternate embodiment, the impact, absorbing means comprise an elastomeric compression spring disposed on the sprocket wheel rim for interaction with the bushings within the tooth root area. Further the expansion of the inserts and spring from their deformed state following disengagement of the bushings from the root area automatically causes the ejection of dirt or other materials compacted against the roots of the sprocket teeth by the bushings.

It is therefore an object of this invention to provide a notched drive sprocket for track-type vehicles having improved noise-reduction means.

It is another object of this invention to provide a notched drive sprocket for track-type vehicles having impact energy absorbing means for absorbing the impact energy of the track bushings as they engage the roots of the sprocket teeth.

Other and further objects and advantages of this invention will be apparent from the following description and claims and are illustrated in the accompanying drawings, which, by way of illustration, show preferred embodiments of the present invention and the principles thereof and what are now considered to be the best modes contemplated for applying these principles. Other embodiments of the invention embodying the same or equivalent principles may be used and structural changes may be made by those skilled in the art without departing from the spirit of the present invention and the purview of the appended claims.

BRIEF DESCRIPTION OF THE DRAWINGS

FIG. 1 is a fragmentary side elevation view of a notched drive sprocket for a track-type vehicle including the impact absorbing means of this invention;

FIG. 2 is a cross-sectional elevation view illustrating in detail the impact absorbing means of FIG. 1, taken along the lines II—II of FIG. 1;

FIG. 3 is a side elevation view of a notched drive sprocket for a track-type vehicle including an alternate embodiment of the impact-absorbing means of this invention;

FIG. 4 is a cross-sectional elevation view taken along the lines IV—IV of FIG. 3 illustrating in detail the alternate embodiment of FIG. 3;

FIG. 5 is a side elevation view of a notched drive sprocket for a track-type vehicle including an alternate embodiment of the impact absorbing means of this invention; and FIG. 6 is a cross-sectional elevation view taken along the lines VI—VI of FIG. 5 illustrating in detail the alternate embodiment of FIG. 5.

DETAILED DESCRIPTION

With reference to FIGS. 1, 3 and 5, a notched drive sprocket for a track-type vehicle (not shown) is generally indicated at 10. The sprocket 10 includes a hub 11 having an annular rim 12 provided with a plurality of peripherally disposed teeth 13 circumferentially separated by arcuate notches forming a plurality of root areas 14 between the teeth 13. A conventional endless track assembly is partially shown at 16, and includes a plurality of track sections 15, each including a pair of laterally spaced track links 17, articulately coupled to corresponding links of the adjoining track sections by a pair of pins 18 disposed within a pair of bushings 19. A plurality of track shoes 21 are each secured to the links 17 of each track section 15. The endless track assembly 16 is driven upon rotation of the drive sprocket 10 through engagement of the sprocket teeth 13 with the bushings 19 which seat in the root areas 14 of the teeth.

The impact absorbing means of this invention are generally indicated at 22. With particular reference to the embodiment of FIGS. 1 and 2, the impact absorbing means include elastomeric inserts 23 comprising cylindrically shaped rubber plugs 24 disposed within cavities 26 centrally formed in the root areas 14 of the teeth 13. The plugs 24 each have an inner end 27 bottomed in the cavity 26 and an outer end 28 extending a predetermined distance above the root area 14 for contact with the bushings 19 prior to contact between the bushings and the tooth root area.

A flat circular metal wear plate 29 is provided to increase the wear life of the plug 24. The wear plate 29 includes a short cylindrical rod 31 extending coaxially therefrom. The wear plate 29 is secured to the outer end 28 of the plug 24 by pressing the rod 31 into the outer end of a first bore 32 in the plug 24. The length of the rod 31 is only a portion of the length of the first bore 32, and the remainder of the bore is utilized as a fill space for the displacement of the plug material thereinto during compression of the plug 24 by the bushing 19. A similar fill space is provided by an annular recess 33 formed about the periphery of the inner end 27 of the plug 24. The tightly-fitting engagement of the plug 24 in the cavity 26, and the similarly tightly fitting engagement of the rod 31 in the first bore 32 provide an effective seal to prevent the fill spaces from becoming filled with dirt during operation of the vehicle.

Because the wear plates 29 are of a low mass deadened by the plugs 24, very little noise is generated by the impact of the bushing thereon.

With particular reference to FIGS. 3 and 4, the impact absorbing means 22 of this embodiment comprise a generally rectangularly shaped elastomeric or rubber compression spring 34 disposed radially inwardly of the sprocket rim 12. One end of the compression spring is bonded to an L-shaped bracket 36, which is, in turn, fastened to the hub 11 as by a bolt 37. A mounting plate 38 is bonded to the other end of the spring 34, and includes a hardened steel impact rod 39 extending therefrom inwardly toward the root area 14. The impact rod 39 is disposed loosely within a second bore 41 formed in the root area 14 of the teeth 13. The compression spring 34 is assembled with a predetermined preload to improve the wear life of the rubber and to increase the amount of stored energy for a given volume of rubber. The preload also biases the plate 38 tightly against the underside of the rim 12 to prevent the impact rod 39 from vibrating in the second bore 41 and thus becoming a source of objectionable noise.

With particular reference to FIGS. 5 and 6, the impact absorbing means 22 of this embodiment comprises an elongated elastomeric strip 42 of varying cross-sectional thickness and narrower at the outer end than the inner end thereof, disposed in a groove 43 extending circumferentially within each root area 14 between adjacent teeth 13. The height of the strip 42 is greater than the depth of the groove 43, so that the bushing 19 engages the strip 42 prior to contacting the root area 14.

In operation, as the bushings 19 engage the sprocket 10, the impact absorbing means 22 substantially absorb the impact energy of the bushings 19 prior to their seating within the root area 14 and the resultant metal-to-metal contact. Thus, the noise customarily produced by the engagement of the bushings with conventional sprockets is substantially eliminated. Further, the return of the impact absorbing means to their undeformed state subsequent to disengagement with the bushings automatically causes ejection of dirt or other materials from the root area compacted therein by the bushings.

Although the invention has been hereinbefore described and illustrated with respect to specific embodiments, various modifications and changes may be made therein without departing from the true spirit and scope of the invention, and thus it is not intended to limit the invention except by the terms of the appended claims.

What is claimed is:

1. In a drive sprocket of the type used to drive an endless track assembly on a track-type vehicle, said drive sprocket having teeth and notches alternately disposed about the circumference of said sprocket, and said notches defining root areas between said teeth, the improvement comprising impact absorbing means for absorbing the impact energy of notch engaging assembly components as they engage the sprocket, said impact absorbing means including impact absorbing members comprising elastomeric plugs disposed within cavities formed in said root areas and extending outwardly into said notches sufficiently to contact said notch engaging components prior to contact between said components and said root areas, said plugs being reinforced by wear plates secured to the outer ends thereof, and wherein said wear plates are secured to said plugs by coaction of a rod secured to each of said wear plates and a bore within each of said plugs.

2. The invention of claim 1, wherein the walls of said plugs and the walls of said cavities define fill spaces for displacement of the elastomer therein during impaction thereof.

3. In a drive sprocket of the type used to drive an endless track assembly on a track-type vehicle, said drive sprocket having teeth and notches alternately disposed about the circumference of said sprocket, and said notches defining root areas between said teeth, the improvement comprising impact absorbing means for absorbing the impact energy of notch engaging assembly components as they engage the sprocket, said impact absorbing means including impact absorbing members disposed within said root areas and extending outwardly into said notches sufficiently to contact said notch engaging components prior to contact between said components and said root areas, said impact absorbing members comprising elastomeric compression springs being secured on one end thereof to the sprocket hub and each including an impact rod extending between said spring and said notches through a bore in the tooth root area, said impact rod being mounted on a plate bonded to the other end of said springs.

4. The invention of claim 3 wherein said plug is secured to said sprocket by means of an L-shaped bracket mounted thereon.

5. In a drive sprocket of the type used to drive an endless track assembly on a track-type vehicle, said drive sprocket having teeth and notches alternately disposed about the circumference of said sprocket, and said notches defining root areas between said teeth, the improvement comprising impact absorbing means for absorbing the impact energy of notch engaging assembly components as they engage the sprocket, said impact absorbing means including impact absorbing members disposed within said root areas and extending outwardly into said notches sufficiently to contact said notch engaging components prior to contact between said components and said root areas, wherein said impact absorbing members comprise a plurality of elongated elastomeric strips, each said strip being disposed in a groove extending circumferentially in the entire root area from the tip of one tooth to the tip of the next from one tooth to another, said elastomeric strips being of varying cross-sectional thickness, and being narrower at the radially outermost end than at the radially innermost end thereof.

6. The invention of claim 5 wherein the height of each said strip is greater than the depth of its accomodating groove in order to ensure said contact.

* * * * *